United States Patent [19]

Pincemin

[11] 4,135,061

[45] Jan. 16, 1979

[54] DEVICE FOR BLOCKING A JUNCTOR OF AN AUTOMATIC SWITCHING SYSTEM

[75] Inventor: Marcel Pincemin, Ris Orangis, France

[73] Assignee: Compagnie Industrielle des Telecommunications Cit-Alcatel, S.A., Paris, France

[21] Appl. No.: 789,593

[22] Filed: Apr. 21, 1977

[30] Foreign Application Priority Data

Apr. 29, 1976 [FR] France ............................. 76 12786

[51] Int. Cl.² .............................................. H04M 3/22
[52] U.S. Cl. ............................. 179/18 E; 179/18 AB
[58] Field of Search ........................ 179/18 AB, 18 E

[56] References Cited

U.S. PATENT DOCUMENTS

| | | | |
|---|---|---|---|
| 3,430,000 | 2/1969 | Röhrig | 179/18 AB |
| 3,824,350 | 7/1974 | Merriam | 179/18 AB |

Primary Examiner—Thomas W. Brown
Attorney, Agent, or Firm—Sughrue, Rothwell, Mion, Zinn and Macpeak

[57] ABSTRACT

The invention comes within the field of telephone equipment and relates in particular to the control of the blocking of a junctor in an automatic switching system. It comprises a first interface circuit followed by an antinoise device, an enabling circuit and a second interface circuit to be disposed between the signalling output of a junctor and its blocking control input. This device causes the blocking of the junctor to be delayed until this junctor is free. This device applies in particular to the control of the blocking of junctors operating in C.C.I.T.T. code 5.

6 Claims, 8 Drawing Figures

DEVICE FOR BLOCKING A JUNCTOR OF AN AUTOMATIC SWITCHING SYSTEM

An automatic switching system (or exchange) permits subscribers' lines and channels leading to other automatic switching systems or to other exchanges to be interconnected. It is composed mainly of a network of automatic switching systems placed between the subscribers and the channels, of decision devices such as registers which control the making of connections subsequent to subscribers' calls and of channel supervisary devices called junctors which supervise calls after they have been set up and also supervise signalling on said channels. A junctor generally includes a blocking control means and a signalling output connected to the decision devices of the automatic switching system and possibly to other automatic switching systems or exchanges via a signalling centre.

The present invention relates in particular to junctors having a blocking control means and a signalling output which can have two states which, by their stable or unstable appearances, characterize the engaged state of the channels. It relates in particular to telephone output junctors operating according to CCITT code 5 which is defined in volume VI of the Green Book published by the International Telecommunications Union. These junctors have a control input which, when grounded, causes them to be blocked and a signalling output whose impedance in relation to earth can have two values, the one high in which it is said that the output is floating, and the other low for which it is said that said output is grounded. Their states result in the presence or absence of a pulsed or non-pulsed earth on their signalling output.

Until now, the blocking (i.e. busying out of service) of a junctor was controlled without taking into consideration the state of the line on which it was installed, so that blocking could come into action while a call was being made on the line and, thereby, cause the call to be interrupted. In actual fact, such a danger occurred only during blocking caused by maintenance operations and was sufficiently small to be negligible. With the bringing into service of new equipment such as concentrators which take advantage of periods of circuit inactivity and which must be able to block a great number of telephone channels independently from the states of these channels, the danger of calls being interrupted has increased.

The present invention aims to eliminate the aforementioned dangers by means of a device which, in preferred embodiments, is of simple design and inexpensive to build.

The present invention provides a device for blocking the junctor of an automatic switching system, said junctor having a control input which, when it is grounded, blocks it and a signalling output on which a ground may or may not be present, pulsed or otherwise, corresponding to the free, engaged or blocked state of said junctor, the engaged state of the junctor being indicated by the presence of continuously applied ground on the signalling output, said device comprising:

a first interface circuit connected to the signalling output of the junctor, transforming the presence or the absence of ground at said output into logic levels;

an enabling circuit having an output and two inputs, a first one of which receives the logic levels coming from the first interface circuit, and a second one of which receives requests for blocking the junctor, said enabling circuit transmitting a blocking request only when the signalling output of the junctor is not earthed;

and a second interface circuit connected between the control input of the junctor and the output of the enabling circuit, transforming a blocking instruction coming from the enabling circuit into a grounding of the control input of the junctor.

Other characteristics and advantages of the invention will become apparent from the accompanying claims and from the following description of an embodiment given by way of an example. This description will be given with reference to the drawings, in which:

The blocking device, which will be described hereinbelow, makes it possible to delay the blocking of a junctor until this junctor becomes free. It is intended in particular for a junctor operating according to CCITT code 5, and placed in an automatic switching system at the output of a channel which terminates e.g. at a station where a concentrator is disposed to allow the capacity of a line to be increased during peak traffic periods. The use of such a concentrator to add calls to normal traffic also requires the provision of means for blocking the "extra" channels coming from an exchange which switches telephone calls to the concentrator. This is particularly true of occasions when the concentrator is out of action.

Figure 1:
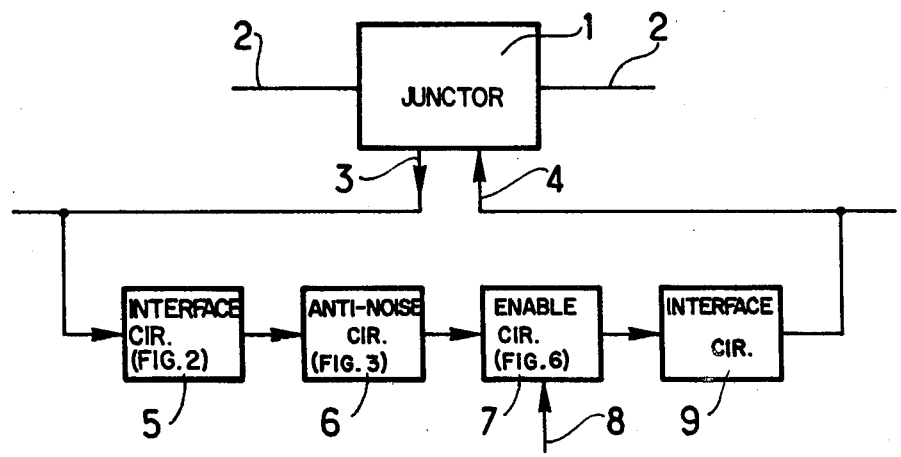
FIG. 1 is a block diagram of a blocking device embodying the invention.

As shown in FIG. 1, the blocking device comprises:

a first interface circuit 5 with its input connected to the signalling output of a junctor 1, which is disposed at the output of a telephone channel 2;

an anti-noise circuit 6 connected to the end of the first interface circuit 5;

an enabling circuit 7 comprising an output and two inputs, one connected to the output of the anti-noise circuit, and the other, 8, receiving possible blocking instructions;

and a second interface circuit 9 connected between the output of the enabling circuit 7 and a control input 4 of the junctor 1.

The junctor 1 operates according to CCITT code 5. The grounding of its control input 4 causes it to be blocked. The signalling output 3 has an impedance in relation to ground which can be either high or low. In one case, it is said that the output is floating and, in the other, that there is a ground on said output. The various states of the junctor 1 are indicated by the following signals on the signalling output:

Junctor free: signalling output floating;
Junctor engaged: ground on the signalling output;
Junctor blocked (acknowledgement of reception of a blocking instruction applied to the junctor control input): grounded pulses of 100 ms by 100 ms;

Junctor blocked by the automatic switching system: grounded pulses of 500 ms by 500 ms;

Junctor blocked subsequent to a switching fault at its level: grounded pulses of 250 by 100 ms.

Figure 2:
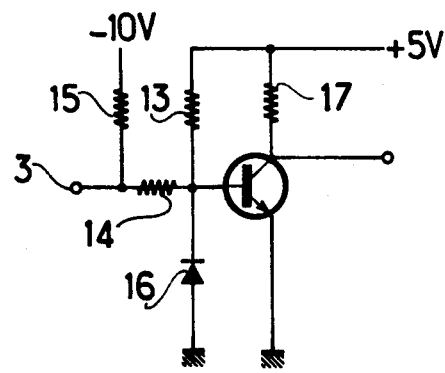
FIG. 2 shows an embodiment of a first interface circuit of FIG. 1.

The function of the first interface circuit referenced 5 in FIG. 1 is to transform the two impedance levels of the signalling output 3 of the junctor 1 into voltage levels which can be assimilated by logic circuits. It can be provided as shown in FIG. 2 by a common emitter connected NPN type transistor whose base is connected by a resistor 13 to a positive supply, e.g. + 5 V, and by a resistor 14 to the signalling output 3 of the junctor 1, this output being connected by a resistor 15 to a negative supply, e.g. − 10 V. The emitter of the transistor is connected directly to ground. The base-emitter junction is protected by a diode 16. The collector terminal of the transistor which constitutes the output terminal of this first interface circuit is connected to the positive supply via a resistor 17. The presence of ground at the signalling output 3 of the junctor 1 causes the transistor to conduct and to become saturated; the collector voltage of the transistor is close to ground potential and corresponds to positive logic level zero. The presence of a high impedance at the signalling output 3 of the junctor 1 causes a negative polarization of the transistor base and, consequently, the transistor becomes blocked. The positive voltage which appears at the collector of the transistor corresponds to positive logic level 1 for T.T.L. logic circuits.

Figure 3:
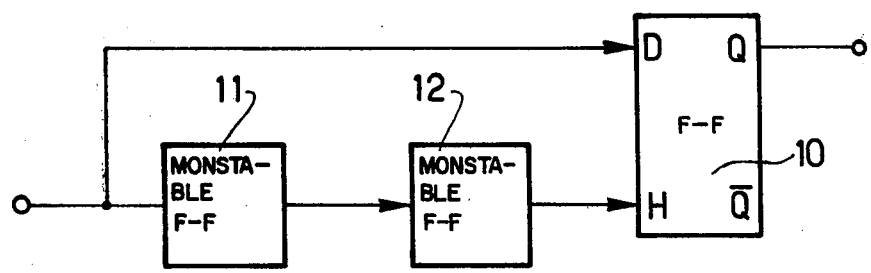
FIG. 3 shows an embodiment of an anti-noise device of FIG. 1.

In general, the junctors of an automatic switching system are disposed in equipment rooms containing hundreds of electromechanical relays and their signalling outputs are very noisy. High amplitude noise pulses of 10 to 20 ms duration are common and it is necessary to eliminate them by means of the anti-noise circuit 6. FIG. 3 shows a possible embodiment of this anti-noise circuit. This circuit comprises a D type master-slave flip-flop 10 whose D (data) inputs and H (clock) inputs are connected to the output of the first interface circuit 5: the data input D is directly connected while the clock input H is connected via two monostable flip-flops 11 and 12 connected in series. The first monostable flip-flop 11 is triggered at each change in logic level of the output of the first interface circuit 5 and emits a square wave pulse lasting more than 50 ms. The trailing edge of this square wave pulse triggers the second monostable flip-flop 12 which emits a clock pulse allowing the possible change in state of the D type master-slave flip-flop 10. In this way, each change in logic level of the anti-noise circuit input is transmitted to the output of this circuit only if it lasts for more than 50 ms.

Figure 4:
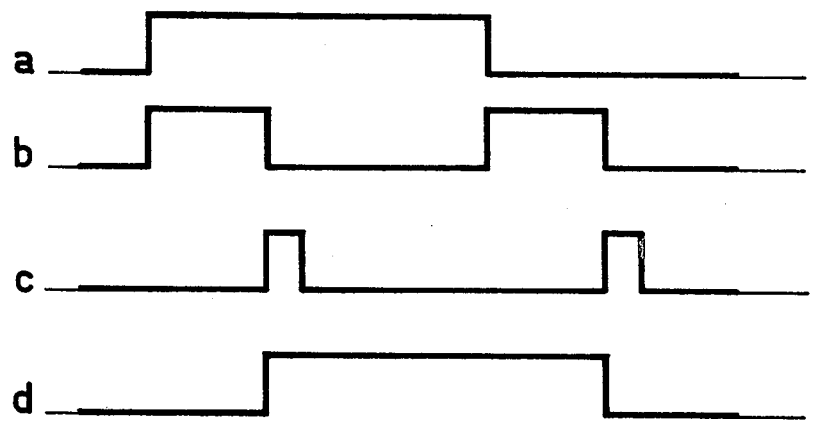
FIGS. 4 and 5 are waveform diagrams of the operation of the anti-noise device.
Figure 5:
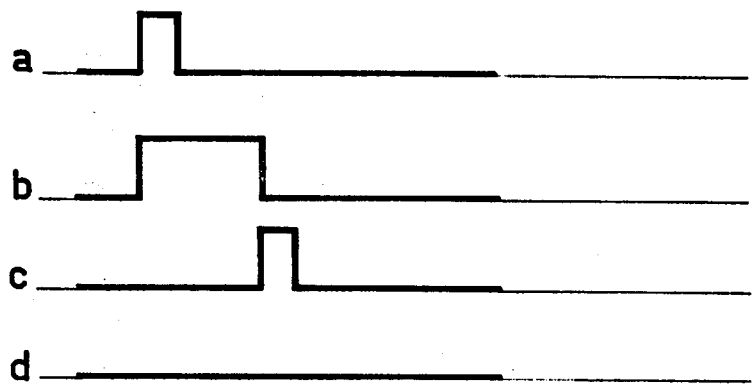

FIGS. 4 and 5 are waveform diagrams illustrating the operation of the antinoise circuit. In these figures, a waveform a represents an input signal which may be a normal binary signal or it may be noise. Waveforms b, c, d represent the logic levels b, c, d obtained in response to the input signal a at various points of the circuit, the waveform b relating to the logic state of the output of the first monostable flip-flop 11, the waveform c corresponding to the logic state of the output of the second monostable flip-flop 12 and the waveform d corresponding to the logic state of the output Q of the D type master-slave flip-flop 10.

In FIG. 4, the binary signal shown in the waveform a is noise free and has a duration between two transitions of at least 100 ms. In this case, the first monostable flip-flop 11 (waveform b), triggered by a first transition of the input signal (waveform a), changes state again before a second transition of the input signal and causes a clock pulse to be emitted (waveform c) by the second monostable flip-flop before said second transition, this causing (waveform d) the D type master-slave flip-flop 10 to change state. A signal analogous to the input signal is then found again at the output Q of the D type master-slave flip-flop, delayed during a period equal to that of the gating pulse produced by the first monostable flip-flop 11.

In FIG. 5, the binary signal represented by the waveform a is a noise signal lasting very much less than 50 ms. The first monostable flip-flop 11 (waveform b), triggered by a first transition of the input signal (waveform a), changes state again only after the second transition of the input signal, this generating the clock pulse (waveform c) by the second monostable flip-flop 12 after the noise signal has disappeared, and consequently prevents the change in state of the D type master-slave flip-flop (waveform d).

Figure 6:
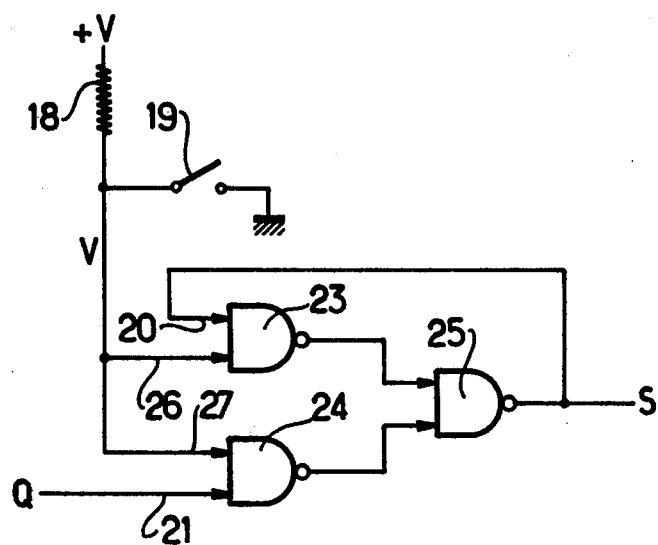
FIG. 6 shows an embodiment of an enabling circuit of FIG. 1.

FIG. 6 shows schematically a possible embodiment of the enabling circuit represented by block 7 of FIG. 1. This circuit comprises three logic "NAND" gates 23, 24, 25. Respective first inputs 26 and 27, of each of the logic gates 23 and 24, are connected firstly to a positive supply + V via a resistor 18, and secondly to earth via a contact 19 of a relay which transmits blocking requests, these requests being indicated by the opening of the contact 19. The outputs of each of the logic gates 23 and 24 are connected to the inputs of the logic gate 25. The second input 20 of the logic gate 23 is connected to the output of the logic gate 25. The second input 21 of the logic gate 24 is connected to the Q output of the anti-noise circuit 6. The output S of the logic gate 25 constitutes the output of the enabling circuit and is connected to the input of the second interface circuit 9.

When there is no blocking request, the contact 19 is closed and the inputs 26 and 27 of the respective logic "NAND" gates 23 and 24 are at logic level 0, this causing a logic level 1 to appear at the outputs of these gates and, consequently, a logic level 0 to appear at the output of the logic "NAND" gate 25.

When there is a blocking request, the contact 19 is open and the inputs 26 and 27, of the respective logic "NAND" gates 23 and 24, are at logic level 1. The behaviour of the circuit depends on its previous state and on the logic level of the second input 21 of the logic "NAND" gate 24. If this gate is at logic level 1, the "NAND" gate 24 has both its inputs at logic level 1 and its output at logic level 0, this causing the presence of a logic level 1 at the output of the "NAND" gate 25. If the second input of the "NAND" gate 24 is at logic level 0, its output is at logic level 1 and the output of the "NAND" gate 25 can be indifferently at logic level 1 or 0.

Figure 7:
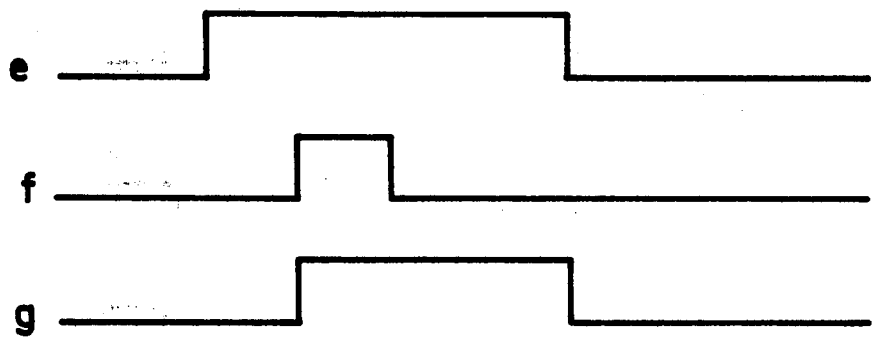
FIG. 7 is a waveform diagram of the operation of the enabling circuit shown in FIG. 6.

The result of the above is that when there is no blocking request, the output of the enabling circuit is at the logic level 0, and that when there is a blocking request said output changes to logic level 1 as soon as the second input 21 of the logic gate 24 changes to logic level 1 and is held at this logic level even after the change in state of said second input, as long as the blocking request is maintained. This is seen in FIG. 7 which shows waveforms of the operation of the enabling circuit of FIG. 6. In this diagram, a waveform e represents a binary signal applied to the inputs 26 and 27 of the "NAND" gates 23 and 24 as a function of the presence (logic level 1) or of the absence (logic level 0) of a blocking request; a waveform f represents a binary signal applied to the input 21 of the logic "NAND" gate 24 by the anti-noise circuit 6 as a function of the presence (logic level 0) or of the absence (logic level 1) of ground on the signalling output of the junctor; a waveform g represents the logic level of the output of the enabling circuit 7 in response to the binary signals represented by the waveforms e and f.

Figure 8:
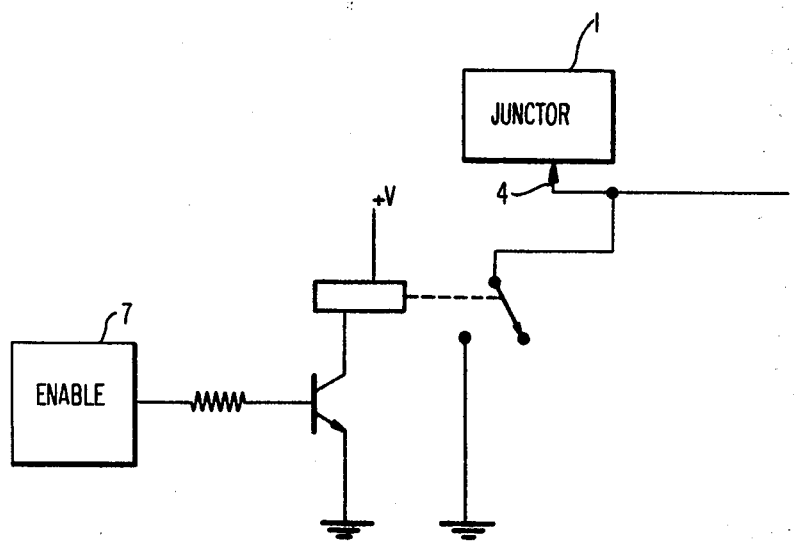
FIG. 8 is a block diagram of the second interface circuit of FIG. 1.

The second interface circuit 9 represented by a rectangle in FIG. 1 can be formed as shown in FIG. 8 by a sensitive relay having a moving contact connected to ground, a normally open contact connected to the blocking control of the junctor 1 and an excitation winding supplied via a transistor operating as a switch, which is blocked when the output of the enabling circuit is at the logic level 0 and conductive when this output is at the logic level 1.

The general operation of the blocking device which has just been described is as follows:

When there is no blocking request, the output of the enabling circuit is at logic level 0; this leaves the sensitive relay at rest and, consequently, leaves the contact which could ground the blocking input of the junctor 1 at open circuit.

When there is a blocking request, the output of the enabling circuit changes to logic level 1, causing the excitation of the sensitive relay and, consequently, the closing of the grounded contact of the blocking input of the junctor 1 (on condition that the signalling output of this junctor is floating for a sufficient length of time), and remains at this logic level 1 as long as the blocking request is not withdrawn.

When the signalling junctor is engaged, its signalling output is at ground, this preventing any blocking request from becoming effective. In contrast, when the junctor is either free or blocked for another reason, its signalling output is floating either continuously or discontinuously, thereby enabling the blocking request to become operative.

What we claim is:

1. A device for blocking the junctor of an automatic switching system, said junctor having a control input which, when grounded blocks said junctor, and a signalling output on which ground may or may not be present, pulsed or otherwise, corresponding to the free, engaged or blocked state of said junctor, the engaged state of the junctor being indicated by the presence of continuously applied ground on the signalling output, said device comprising:
    a first interface circuit connected to the signalling output of the junctor, transforming the presence or the absence of ground at said output into logic levels;
    an enabling circuit having an output and two inputs, a first input receiving the logic levels coming from the first interface circuit, and a second input receiving requests for blocking the junctor, said enabling circuit transmitting a blocking request only when the signalling output of the junctor is not grounded;
    and a second interface circuit connected between the control input of the junctor and the output of the enabling circuit, said second interface circuit transforming a blocking instruction coming from the enabling circuit into a ground of the control input of the junctor.

2. A device according to claim 1, wherein the first interface circuit comprises a common emitter connected transistor.

3. A device according to claim 1, wherein said device further includes an anti-noise device connected between the first interface circuit and the enabling circuit.

4. A device for blocking the junctor of an automatic switching system, said junctor having a control input which, when it is grounded, blocks said junctor, and a signalling output on which ground may or may not be present, pulsed or otherwise, corresponding to the free, engaged or blocked state of said junctor, the engaged state of the junctor being indicated by the presence of continuously applied ground on the signalling output, said device comprising:
    a first interface circuit connected to the signalling output of the junctor, transforming the presence or the absence of ground at said output into logic levels;
    an enabling circuit having an output and two inputs, a first input receiving the logic levels coming from the first interface circuit, and a second input receiving requests for blocking the junctor, said enabling circuit transmitting a blocking request only when the signalling output of the junctor is not grounded;
    a second interface circuit connected between the control input of the junctor and the output of the enabling circuit, said second interface circuit transforming a blocking instruction coming from the enabling circuit into a ground of the control input of the junctor; and
    an anti-noise circuit connected between the first interface circuit and the enabling circuit, comprising, a D type master-slave flip-flop whose D (data) input and H (clock) input are connected to the output of the first interface circuit, the D (data) input being directly connected thereto while the H (clock) is connected via two monostable multivibrators connected in series, the first monostable multivibrator being triggered by the changes in logic state of the output of the first interface circuit and the second monostable multivibrator being triggered by the trailing edge of the output of the first monostable multivibrator.

5. A device according to claim 4, wherein the enabling circuit comprises two first and second input logic "NAND" gates, each having a first input connected both to a positive supply via a resistor, and to ground via a contact, which is open when there is a blocking request, the respective outputs of said "NAND" gates being connected respectively to two inputs of a third logic "NAND" gate whose output comprises the output of the enabling circuit, the second input of one of the first and second "NAND" gates being a feedback output of the third "NAND" gate and the second input of the other of said first and second "NAND" gates constituting the input to which the logic level coming from the first interface circuit is applied.

6. A device according to claim 4, wherein the second interface circuit comprises a ground contact actuated by an electromechanical relay, whose excitation winding is fed via a transistor operating as a switch and controlled by the output of the enabling circuit.

* * * * *